(12) United States Patent
Tsuji

(10) Patent No.: US 12,339,191 B2
(45) Date of Patent: Jun. 24, 2025

(54) PRESSURE SENSOR CHIP, PRESSURE SENSOR, AND MANUFACTURING METHOD THEREOF

(71) Applicant: Murata Manufacturing Co., Ltd., Nagaokakyo (JP)

(72) Inventor: Daiki Tsuji, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 416 days.

(21) Appl. No.: 18/093,349

(22) Filed: Jan. 5, 2023

(65) Prior Publication Data

US 2023/0146603 A1     May 11, 2023

Related U.S. Application Data

(63) Continuation of application No. PCT/JP2021/025839, filed on Jul. 8, 2021.

(30) Foreign Application Priority Data

Aug. 3, 2020    (JP) ................................. 2020-131925

(51) Int. Cl.
    *G01L 13/02*        (2006.01)
    *G01L 9/00*         (2006.01)
    *G01L 9/12*         (2006.01)

(52) U.S. Cl.
    CPC .......... *G01L 9/0072* (2013.01); *G01L 13/026* (2013.01)

(58) Field of Classification Search
    CPC ..... G01L 13/02; G01L 13/025; G01L 13/026; G01L 9/0072
    See application file for complete search history.

(56) References Cited

U.S. PATENT DOCUMENTS 8,984,950 B2 *   3/2015   Potasek ................. G01L 9/0048
                                                                                  73/717
2003/0107096 A1    6/2003   Kurtz et al.
(Continued)

FOREIGN PATENT DOCUMENTS

EP          1009986 B1 *   9/2002   ............. G01L 13/02
JP          0777471 A      3/1995
(Continued)

OTHER PUBLICATIONS

International Search Report in PCT/JP2021/025839, mailed Aug. 10, 2021, 3 pages.
(Continued)

*Primary Examiner* — Herbert K Roberts
(74) *Attorney, Agent, or Firm* — Keating & Bennett, LLP

(57) ABSTRACT

A pressure sensor chip includes a base, a first layer including a first cavity and joined to an upper surface of the base, a second layer joined to an upper surface of the first layer, a third layer including a second cavity and joined to an upper surface of the second layer, and a fourth layer including a third cavity and joined to an upper surface of the third layer. The second layer includes a first diaphragm between the first and second cavities. The fourth layer includes a second diaphragm between the second cavity and a space in communication with outside. A top end of the third cavity is in communication with outside. The bottom end of the third cavity is in communication with the second cavity. The first cavity is sealed. The pressure in the first cavity is lower than the pressure in the second cavity.

15 Claims, 10 Drawing Sheets

(56) References Cited

U.S. PATENT DOCUMENTS

| | | | |
|---|---|---|---|
| 2004/0187588 A1 | 9/2004 | Miyazawa | |
| 2013/0283912 A1* | 10/2013 | Lin | G01L 13/025 |
| | | | 73/717 |
| 2014/0338459 A1* | 11/2014 | Besling | G01L 19/148 |
| | | | 73/718 |
| 2015/0268115 A1* | 9/2015 | Robert | G01L 9/0073 |
| | | | 73/718 |
| 2018/0136063 A1* | 5/2018 | Wagner | G01L 13/026 |
| 2021/0108981 A1 | 4/2021 | Tokuda et al. | |

FOREIGN PATENT DOCUMENTS

| | | |
|---|---|---|
| JP | 11241966 A | 9/1999 |
| JP | 2001124645 A | 5/2001 |
| JP | 2003042878 A | 2/2003 |
| JP | 2013234959 A | 11/2013 |
| JP | 2021060336 A | 4/2021 |

OTHER PUBLICATIONS

Written Opinion in PCT/JP2021/025839, mailed Aug. 10, 2021, 4 pages.

* cited by examiner

PRESSURE SENSOR CHIP, PRESSURE SENSOR, AND MANUFACTURING METHOD THEREOF

CROSS REFERENCE TO RELATED APPLICATIONS

This application claims the benefit of priority to Japanese Patent Application No. 2020-131925 filed on Aug. 3, 2020 and is a Continuation application of PCT Application No. PCT/JP2021/025839 filed on Jul. 8, 2021. The entire contents of each application are hereby incorporated herein by reference.

BACKGROUND OF THE INVENTION

1. Field of the Invention

The present invention relates to a pressure sensor chip to measure pressure from outside, to a pressure sensor including the pressure sensor chip, and to a method of manufacturing the pressure sensor chip and the pressure sensor.

2. Description of the Related Art

A differential pressure sensor configured to measure differential pressure between two pressures is known as a type of a pressure sensor. For example, the differential pressure sensor is applied to a fluid pipe having a constricted section built in and measures the differential pressure between pressures upstream and downstream of the constricted section. The differential pressure measured can be converted to a flow rate using the relational expression between flow rate and differential pressure, which is described in JIS Z8762 of the Japan Industrial Standards.

To perform the above conversion, it is necessary to obtain a static pressure, such as a gauge pressure relative to the atmospheric pressure or an absolute pressure relative to the vacuum, in addition to the differential pressure.

Japanese Unexamined Patent Application Publication No. 2003-42878 discloses a pressure sensor equipped with a differential-pressure sensor chip configured to measure differential pressure and a static-pressure sensor chip configured to measure static pressure.

SUMMARY OF THE INVENTION

In the pressure sensor disclosed in Japanese Unexamined Patent Application Publication No. 2003-42878, however, the differential-pressure sensor chip and the static-pressure sensor chip are provided as separate chips, which leads to an increase in the size of the pressure sensor.

In order to reduce the size of the pressure sensor, the differential pressure sensor and the static pressure sensor may be integrated in one chip. The integration, however, faces the following challenges as described in Japanese Unexamined Patent Application Publication No. 2003-42878.

The pressure sensor measures pressure in accordance with the amount of bending of a diaphragm. The diaphragm provided for the static pressure sensor needs to withstand a large pressure and accordingly have a greater thickness compared with the diaphragm provided for the differential pressure sensor. If the differential pressure sensor and the static pressure sensor were formed integrally in the same chip in the pressure sensor disclosed in Japanese Unexamined Patent Application Publication No. 2003-42878, the diaphragm for the differential pressure sensor and the diaphragm for the static pressure sensor would need to have different thicknesses in the same semiconductor substrate. However, forming diaphragms having different thicknesses in the same semiconductor substrate complicates the manufacturing process.

Accordingly, the size reduction of the pressure sensor is achieved in Japanese Unexamined Patent Application Publication No. 2003-42878 by disposing the differential-pressure sensor chip and the static-pressure sensor chip closely on the same base. However, the differential-pressure sensor chip and the static-pressure sensor chip are separate chips and are not integrated in the same chip in the pressure sensor of Japanese Unexamined Patent Application Publication No. 2003-42878, which limits the degree of size reduction of the pressure sensor.

Preferred embodiments of the present invention provide pressure sensor chips in each of which two diaphragms can be integrated in the same chip without complicating the manufacturing process.

According to an aspect of a preferred embodiment of the present invention, a pressure sensor chip including a first diaphragm and a second diaphragm to measure pressure includes a base, a first layer, a second layer, a third layer, and a fourth layer. The first layer includes a first cavity and is joined to the base. The second layer is joined to a surface of the first layer opposite to the base. The third layer includes a second cavity and is joined to a surface of the second layer opposite to the first layer. The fourth layer includes a third cavity and is joined to a surface of the third layer opposite to the second layer. In the pressure sensor chip, the second layer includes the first diaphragm between the first cavity and the second cavity, and the fourth layer includes the second diaphragm between the second cavity and a space in communication with outside. In addition, a first end of the third cavity is in communication with outside, and a second end of the third cavity is in communication with the second cavity. The first cavity is sealed, and a pressure in the first cavity is lower than a pressure in the second cavity.

According to preferred embodiments of the present invention, two diaphragms can be integrated in the same chip without complicating the manufacturing process.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
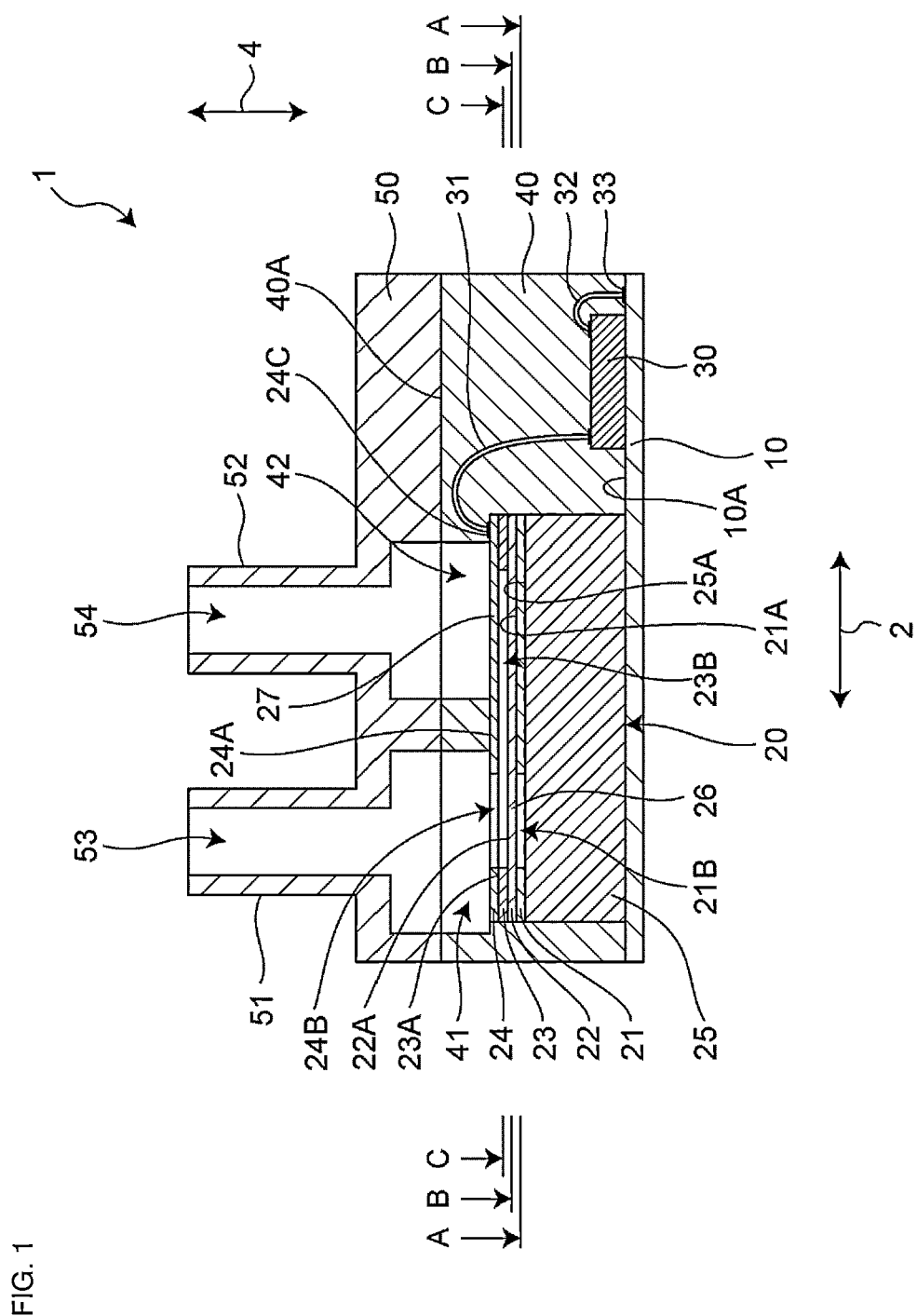
FIG. 1 is a longitudinal sectional view illustrating a pressure sensor according to a first preferred embodiment of the present invention.

According to an aspect of a preferred embodiment of the present invention, a pressure sensor chip including a first diaphragm and a second diaphragm to measure pressure includes a base, a first layer, a second layer, a third layer, and a fourth layer. The first layer includes a first cavity and is joined to the base. The second layer is joined to a surface of the first layer opposite to the base. The third layer includes a second cavity and is joined to a surface of the second layer opposite to the first layer. The fourth layer includes a third cavity and is joined to a surface of the third layer opposite to the second layer. In the pressure sensor chip, the second layer includes the first diaphragm between the first cavity and the second cavity, and the fourth layer includes the second diaphragm between the second cavity and a space in communication with outside. In addition, a first end of the third cavity is in communication with outside, and a second end of the third cavity is in communication with the second cavity. The first cavity is sealed, and a pressure in the first cavity is lower than a pressure in the second cavity.

According to this configuration, the pressure in the first cavity and the pressure in the second cavity act on the first diaphragm. As a result, the first diaphragm can measure pressure relative to the pressure in the first cavity that is sealed and airtight. The pressure in the second cavity and the pressure from the outside act on the second diaphragm. As a result, the second diaphragm can measure the differential pressure between these two pressures. In other words, according to this configuration, a single pressure sensor chip can measure differential pressure between two pressures as well as absolute pressure relative to the vacuum. Moreover, two diaphragms are integrated in a single pressure sensor chip. This enables size reduction of the pressure sensor chip.

According to this configuration, the first diaphragm and the second diaphragm are located in different layers. As a result, the thickness of the second layer included in the first diaphragm and the thickness of the fourth layer included in the second diaphragm can be made different without complicating the manufacturing process.

In the pressure sensor chip, the first cavity may be under vacuum or substantially under vacuum. This enables the first diaphragm to function as a diaphragm to measure an absolute pressure.

In the pressure sensor chip, the fourth layer may have a thickness smaller than a thickness of the second layer. According to this configuration, the second diaphragm is thinner than the first diaphragm, which enables a small pressure difference to bend the second diaphragm. If the pressure in the first cavity is low, in other words, if the reference pressure for the first diaphragm is low, the amount of bending of the first diaphragm increases. This may lead to the breakage of the first diaphragm. According to this configuration, however, the first diaphragm is thicker than the second diaphragm, which can reduce the likelihood of the first diaphragm breaking.

In the pressure sensor chip, the base, the second layer, and the fourth layer may be electrical conductors, and the first layer and the third layer may be electrical insulators. According to this configuration, the pressure sensor chip can operate as a capacitance sensor.

In the pressure sensor chip, the first diaphragm does not need to overlap the second diaphragm as viewed in plan. This can reduce the likelihood of the pressure in the first cavity affecting the second diaphragm via the second layer and the second cavity. This enables the second diaphragm to measure differential pressure accurately.

In the pressure sensor chip, the first diaphragm may overlap the second diaphragm as viewed in plan. As a result, the first diaphragm becomes large, which can increase the sensitivity of the first diaphragm.

According to another aspect of a preferred embodiment of the present invention, a pressure sensor includes the above-described pressure sensor chip and a covering portion that covers the pressure sensor chip. The covering portion includes a fourth cavity through which the third cavity is in communication with the outside and also includes a fifth cavity through which the surface of the fourth layer positioned opposite to the third layer is exposed to outside. In addition, the second diaphragm is positioned between the second cavity and the fifth cavity.

According to this configuration, the covering portion can protect the pressure sensor chip.

In the pressure sensor, the covering portion may include a tubular-shaped first cap protruding from a periphery of the fourth cavity in a direction away from the pressure sensor chip and a tubular-shaped second cap protruding from a periphery of the fifth cavity in a direction away from the pressure sensor chip. According to this configuration, the pressure sensor can be connected easily to outside devices through the first and second caps.

According to another aspect of a preferred embodiment of the present invention, a method of manufacturing a pressure sensor chip includes joining a first layer to a base, the first layer including a first cavity patterned therein, joining a second layer to a surface of the first layer opposite to the base, joining a third layer to a surface of the second layer opposite to the first layer, the third layer including a second cavity patterned therein, the third layer being joined in such a manner that a first diaphragm is formed in the second layer between the first cavity and the second cavity, and joining a fourth layer to a surface of the third layer opposite to the second layer, the fourth layer including a third cavity patterned therein, the fourth layer being joined in such a manner that a first end of the third cavity is in communication with outside, that a second end of the third cavity is in communication with the second cavity, and that a second diaphragm is formed in the fourth layer between the second cavity and a space in communication with the outside.

According to another aspect of a preferred embodiment of the present invention, a method of manufacturing a pressure sensor includes joining a first layer to a base, the first layer including a first cavity patterned therein, joining a second layer to a surface of the first layer opposite to the base, joining a third layer to a surface of the second layer opposite to the first layer, the third layer including a second cavity patterned therein, the third layer being joined in such a manner that a first diaphragm is formed in the second layer between the first cavity and the second cavity, joining a fourth layer to a surface of the third layer opposite to the second layer, the fourth layer including a third cavity patterned therein, the fourth layer being joined in such a manner that the third cavity is in communication with the second cavity, and forming a covering portion so as to cover the base, the first layer, the second layer, the third layer, and the first layer, the covering portion including a fourth cavity and a fifth cavity, the covering portion being formed in such a manner that the fourth cavity exposes the third cavity to outside, that the fifth cavity exposes a surface of the fourth layer to outside opposite to the third layer, and that a second diaphragm is formed in the fourth layer between the second cavity and the fifth cavity.

According to the above manufacturing methods, pressure sensor chips and pressure sensors can be manufactured without using a complicated step, for example, a step of changing the thickness of the same layer.

First Preferred Embodiment

FIG. 1 is a longitudinal sectional view illustrating a pressure sensor according to a first preferred embodiment of the present invention.

A pressure sensor 1 is capable of detecting a small pressure variation. As illustrated in FIG. 1, the pressure sensor 1 includes two diaphragms, in other words, a first diaphragm 26 and a second diaphragm 27, which will be described in detail later. The pressure sensor 1 detects pressure due to the first diaphragm 26 and the second diaphragm 27 bending. The pressure sensor 1 is able to measure two separate pressures.

As illustrated in FIG. 1, the pressure sensor 1 includes a substrate 10, a pressure sensor chip 20, an application specific integrated circuit (ASIC) 30, a first covering portion 40, and a second covering portion 50. The application specific integrated circuit 30 is hereinafter referred to as the "ASIC 30".

The substrate 10 is a tabular member. The substrate 10 is made of a material, such as a resin (for example, epoxy resin or phenol resin), a ceramic material, or aluminum. The substrate 10 has wiring traces, pads, and through-holes or the like, which are made of a copper or the like and are formed on surfaces of the substrate 10. The wiring traces, pads, and through-holes are electrically connected to one another.

Figure 2:
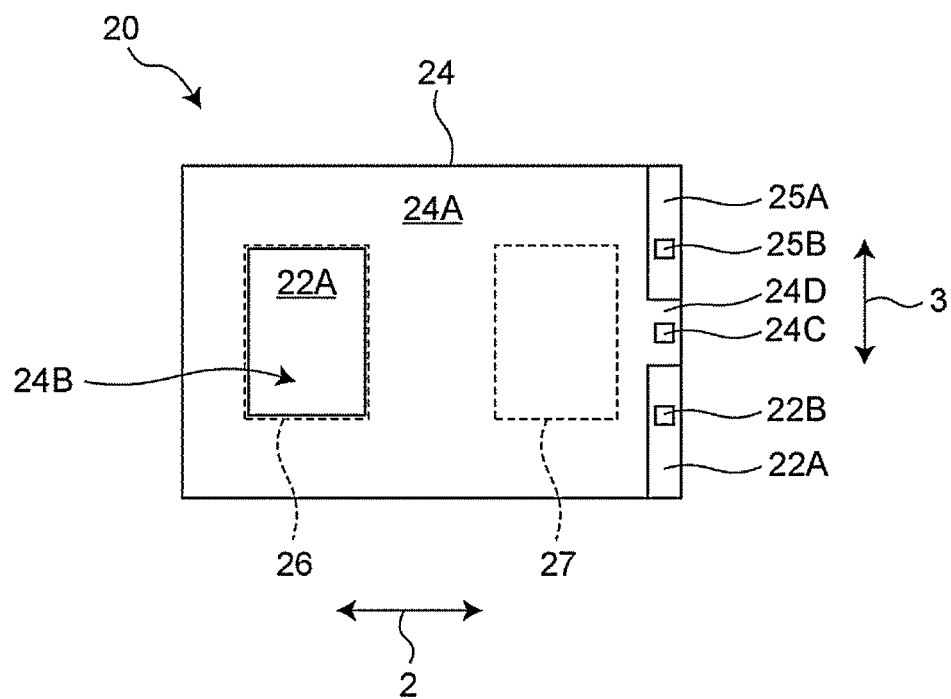
FIG. 2 is a plan view illustrating a pressure sensor chip included in the pressure sensor of FIG. 1.

FIG. 2 is a plan view illustrating the pressure sensor chip included in the pressure sensor of FIG. 1.

As illustrated in FIG. 1, the pressure sensor chip 20 is mounted on the substrate 10. Known methods can be used to mount the pressure sensor chip 20. In the first preferred embodiment, the pressure sensor chip 20 includes a base 25 (to be described later), and the base 25 is adhered to an upper surface 10A of the substrate 10 using an adhesive.

As illustrated in FIGS. 1 and 2, the exterior of the pressure sensor chip 20 of the first preferred embodiment is shaped like a cuboid. Note that the shape of the pressure sensor chip 20 is not necessarily the cuboid but may be, for example, a round column. The pressure sensor chip 20 is a MEMS (micro-electro-mechanical systems) device. The pressure sensor chip 20 has a structure in which multiple layers are laminated. The structure of the pressure sensor chip 20 will be described in detail later.

As illustrated in FIG. 1, the ASIC 30 is mounted on the upper surface 10A of the substrate 10. Known methods can be used to mount the pressure sensor chip 20. In the first preferred embodiment, the ASIC 30 is adhered to the upper surface 10A using an adhesive.

The ASIC 30 is connected to the pressure sensor chip 20 using an electrically conductive wire made of aluminum or copper (for example, a wire 31 illustrated in FIG. 1). The ASIC 30 is also connected to a pad 33 formed on a surface of the substrate 10 using an electrically conductive wire 32 made of aluminum or copper.

The ASIC 30 processes signals received from the pressure sensor chip 20 via the wire 31 or the like and outputs processed signals to an external device via a wire 32 and the like. The signal processing of the ASIC 30 includes at least one of the following functions or features.

For example, the signal processing includes conversion processing in which analog signals received from the pressure sensor chip 20 are converted to digital signals. In the first preferred embodiment, the signals received from the pressure sensor chip 20 are current values that correspond to the amounts of bending of the first diaphragm 26 and the second diaphragm 27, which will be described later. For example, the signal processing includes filtering processing in which low-frequency signals are obtained by filtering out high-frequency noise components of the digital signals obtained after the conversion processing. For example, the signal processing includes correction processing in which the signals obtained after the filtering processing are corrected through arithmetic operation using data from an external temperature sensor and preset correction factors. The temperature sensor is disposed, for example, on the substrate 10 near the pressure sensor chip 20. The correction factors are stored, for example, in an internal memory included in the ASIC 30.

The first covering portion 40 and the second covering portion 50 are made of a resin, such as epoxy resin. The first covering portion 40 and the second covering portion 50 are examples of the covering portion.

The first covering portion 40 covers the pressure sensor chip 20. In the first preferred embodiment, the first covering portion 40 covers the surfaces of the pressure sensor chip 20 except for the surface being in contact with the substrate 10. The first covering portion 40 includes two cavities 41 and 42 that pierce the first covering portion 40. The cavities 41 and 42 expose a portion of the pressure sensor chip 20 to outside. The cavity 41 is an example of the fourth cavity. The cavity 42 is an example of the fifth cavity.

The second covering portion 50 is joined to the first covering portion 40. The second covering portion 50 is joined to the surface of the first covering portion 40 that is opposite to the surface being in contact with the pressure sensor chip 20. The second covering portion 50 includes two tubular caps 51 and 52. In the first preferred embodiment, the caps 51 and 52 are shaped like tubes. The caps 51 and 52 protrude outward in a direction away from the first covering portion 40 and the pressure sensor chip 20. An internal space 53 of the cap 51 is in communication with the cavity 41. An internal space 54 of the cap 52 is in communication with the cavity 42. The cap 51 is an example of the first cap. The cap 52 is an example of the second cap.

The following describes the structure of the pressure sensor chip 20 in detail. Note that in the following description, the pressure sensor chip 20 is shaped like the cuboid of which the sides extend in three directions, which are defined as a longitudinal direction 2, a transverse direction 3, and a height direction 4. In FIG. 1, the transverse direction 3 corresponds to the depth direction of the illustration. The height direction 4 is defined such that the substrate 10 is located at a lower position and the second covering portion 50 is located at an upper position in FIG. 1.

As illustrated in FIG. 1, the pressure sensor chip 20 includes a first layer 21, a second layer 22, a third layer 23, a fourth layer 24, and a base 25.

The first layer 21 and the third layer 23 are electrical insulators. In the first preferred embodiment, the first layer 21 and the third layer 23 are made of silicon dioxide. The second layer 22, the fourth layer 24, and the base 25 are electric conductors. In the first preferred embodiment, the second layer 22, the fourth layer 24, and the base 25 are made of silicon.

The base 25 is adhered to the upper surface 10A of the substrate 10 by an adhesive or the like. The first layer 21 is joined to an upper surface 25A of the base 25. The second layer 22 is joined to an upper surface 21A of the first layer 21, which is the surface opposite to the surface facing the base 25. The third layer 23 is joined to an upper surface 22A of the second layer 22, which is the surface opposite to the surface facing the first layer 21. The fourth layer 24 is joined to an upper surface 23A of the third layer 23, which is the surface opposite to the surface facing the second layer 22. Accordingly, the pressure sensor chip 20 is formed by laminating the base 25, the first layer 21, the second layer 22, the third layer 23, and the fourth layer 24 in this order from the bottom.

In the first preferred embodiment, the first layer 21, the second layer 22, the third layer 23, and the fourth layer 24 have thicknesses (i.e., lengths in the height direction 4) in an approximate range of about 2 μm to about 5 μm, for example.

The pressure sensor chip 20 is covered by the first covering portion 40 except for the lower surface of the base 25 that is joined to the substrate 10. In other words, the first covering portion 40 covers the upper surface 24A of the fourth layer 24 and the side surfaces of the base 25, the first layer 21, the second layer 22, the third layer 23, and the fourth layer 24.

Figure 3:
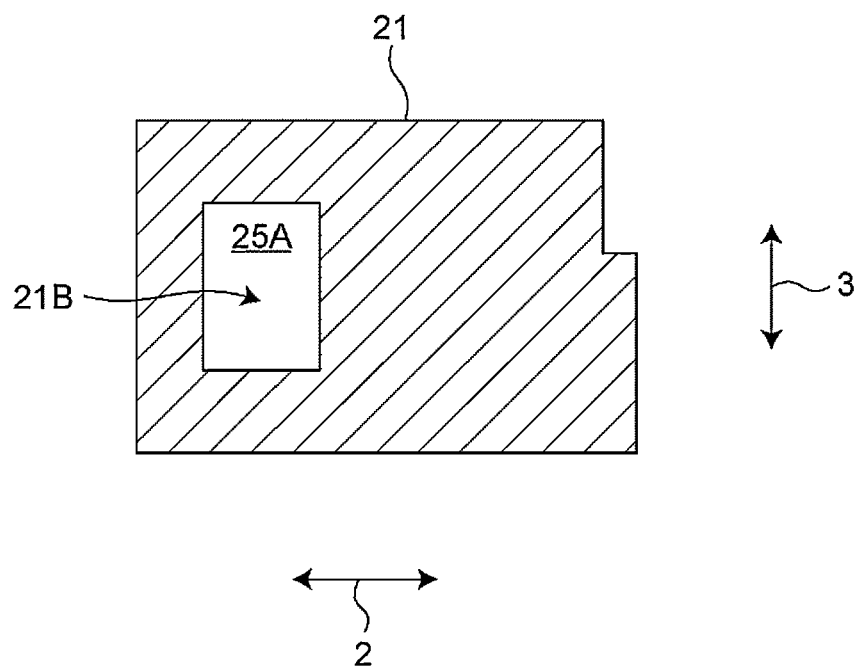
FIG. 3 is a cross-sectional view taken along line A-A in FIG. 1.

FIG. 3 is section A-A of the pressure sensor chip 20 illustrated in FIG. 1. As illustrated in FIGS. 1 and 3, a cavity 21B is formed in the first layer 21. The cavity 21B pierces the first layer 21 in the height direction 4. The cavity 21B is an example of the first cavity.

Figure 4:
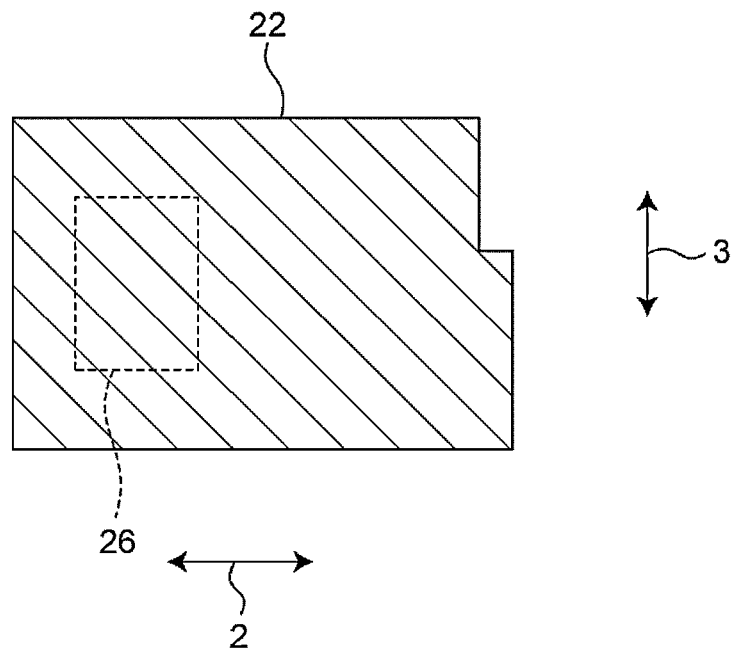
FIG. 4 is a cross-sectional view taken along line B-B in FIG. 1.

FIG. 4 is section B-B of the pressure sensor chip 20 illustrated in FIG. 1. As illustrated in FIGS. 1 and 4, no cavity is formed in the second layer 22. As illustrated in FIG. 1, the cavity 21B of the first layer 21 is interposed between the base 25 and the second layer 22.

The top end of the cavity 21B is sealed by the second layer 22, while the bottom end of the cavity 21B is sealed by the base 25. Accordingly, the cavity 21B is made airtight. In the first preferred embodiment, the cavity 21B is under vacuum.

The cavity 21B is not necessarily under true vacuum but may be substantially under vacuum. When the pressure in the cavity 21B is less than about 3000 Pa and greater than 0 Pa, the cavity 21B is substantially under vacuum. When the pressure in the cavity 21B is 0 Pa, the cavity 21B is under vacuum. The cavity 21B is not necessarily under vacuum nor substantially under vacuum. Whatever the inside condition of the cavity 21B may be (under vacuum, substantially under vacuum, or under any other conditions), the pressure in the cavity 21B is lower than the pressure in a cavity 23B (to be described later).

Figure 5:
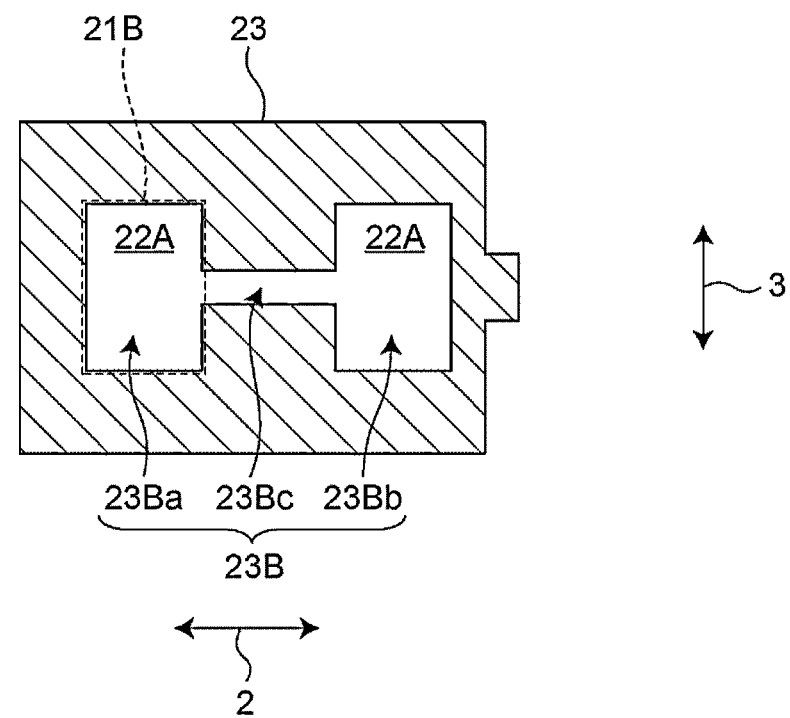
FIG. 5 is a cross-sectional view taken along line C-C in FIG. 1.

FIG. 5 is section C-C of the pressure sensor chip 20 illustrated in FIG. 1. As illustrated in FIGS. 1 and 5, a cavity 23B is formed in the third layer 23. The cavity 23B pierces the third layer 23 in the height direction 4. The cavity 23B is an example of the second cavity.

As illustrated in FIG. 5, the cavity 23B has a first space 23Ba, a second space 23Bb, and a third space 23Bc. The first space 23Ba is in communication with the third space 23Bc. The third space 23Bc is in communication with the second space 23Bb.

The first space 23Ba overlaps the cavity 21B of the first layer 21 as the pressure sensor chip 20 is viewed in the height direction 4, in other words, as viewed in plan.

A portion of the second layer 22 that overlaps the first space 23Ba and the cavity 21B as viewed in plan (see FIG. 5) defines and functions as the first diaphragm 26 (see FIG. 4). In other words, a portion of the first layer 21 that is interposed between the first space 23Ba and the cavity 21B (see FIG. 1) defines and functions as the first diaphragm 26. The first diaphragm 26 can bend in the height direction 4 because spaces are provided at the upper and lower sides of the first diaphragm 26 as illustrated in FIG. 1. In the first preferred embodiment, the first diaphragm 26 is shaped like a rectangle as viewed in plan, and the lengths of the sides of the rectangle are in the range of about 200 μm to about 500 μm, for example.

As illustrated in FIG. 5, the second space 23Bb does not overlap the cavity 21B of the first layer 21 as viewed in plan. In the first preferred embodiment, the size and the shape of the second space 23Bb are the same as the size and the shape of the first space 23Ba as viewed in plan. However, at least one of the size and the shape of the second space 23Bb can be different from that of the first space 23Ba.

In the first preferred embodiment, in the transverse direction 3, the length of the third space 23Bc is smaller than the length of the first space 23Ba and the length of the second space Bb. In other words, the width of the third space 23Bc is smaller than the width of the first space 23Ba and the width of the second space Bb. In the first preferred embodiment, the third space 23Bc does not overlap the cavity 21B of the first layer 21 as viewed in plan.

As illustrated in FIGS. 1 and 2, a cavity 24B is formed in the fourth layer 24. The cavity 24B pierces the fourth layer 24 in the height direction 4. The cavity 24B is an example of the third cavity.

As illustrated in FIG. 1, the bottom end of the cavity 24B is in communication with the first space 23Ba of the cavity 23B of the third layer 23. In other words, the cavity 24B overlaps the first space 23Ba as viewed in plan. The top end of the cavity 24B is in communication with the outside of the pressure sensor chip 20. The bottom end of the cavity 24B is an example of the second end of the third cavity. The top end of the cavity 24B is an example of the first end of the third cavity.

As described above, the upper surface 24A of the fourth layer 24, which is opposite to the surface facing the third layer 23, is covered by the first covering portion 40 as illustrated in FIG. 1. The first covering portion 40 is in contact with the upper surface 24A.

The cavity 41 of the first covering portion 40 is positioned directly above the cavity 24B. Accordingly, the cavity 41 exposes the cavity 24B to outside of the pressure sensor chip 20. In addition, the cavity 23B and the cavity 24B are in communication with the outside of the pressure sensor 1 through the cavity 41 and also through the internal space 53 of the cap 51 of the second covering portion 50.

The cavity 42 of the first covering portion 40 is positioned directly above the fourth layer 24. The cavity 42, however, does not overlap the cavity 24B as viewed in plan. Accordingly, the cavity 42 exposes the upper surface 24A of the fourth layer 24 to outside of the pressure sensor chip 20. In addition, the upper surface 24A is in communication with the outside of the pressure sensor 1 through the cavity 42 and also through the internal space 54 of the cap 52 of the second covering portion 50.

As viewed in plan, the cavity 42 overlaps the second space 23Bb of the cavity 23B of the third layer 23. As illustrated in FIGS. 1 and 2, a portion of the fourth layer 24 that overlaps the cavity 42 and the second space 23Bb as viewed in plan defines and functions as the second diaphragm 27. In other words, a portion of the fourth layer 24 that is interposed between the cavity 42 and the second space 23Bb defines and functions as the second diaphragm 27. The second diaphragm 27 can bend in the height direction 4 because spaces are provided at the upper and lower sides of the second diaphragm 27. In the first preferred embodiment, the second diaphragm 27 is shaped like a rectangle as viewed in plan, and the size of the second diaphragm 27 is substantially the same as that of the first diaphragm 26. The size of the second diaphragm 27 may be different from the size of the first diaphragm 26.

The cavity 42 is a space outside the pressure sensor chip 20. In other words, the second diaphragm 27 is interposed between the second space 23Bb and the space in communication with the outside of the pressure sensor chip 20. The cavity 42 is in communication with the outside of the pressure sensor 1 through the internal space 54 of the cap 52. Accordingly, the second diaphragm 27 is interposed between the second space 23Bb and the space in communication with the outside of the pressure sensor 1.

In the first preferred embodiment, as illustrated in FIG. 2, the second diaphragm 27 does not overlap the first diaphragm 26 as viewed in plan.

The first diaphragm 26 and the second diaphragm 27 are operable to measure pressure, which will be described in detail below.

As illustrated in FIG. 2, the fourth layer 24 includes a projection 24D at one end thereof in the longitudinal direction 2. The projection 24D is formed at the one end of the fourth layer 24 in the longitudinal direction 2 by removing opposite corner portions of the fourth layer 24 positioned in the transverse direction 3. A pad 24C is formed on the upper surface of the projection 24D. As illustrated in FIG. 1, the wire 31 is connected to the pad 24C. This electrically connects the fourth layer 24 having the second diaphragm 27 to the ASIC 30.

As illustrated in FIG. 5, the opposite corner portions of the third layer 23 positioned in the transverse direction 3 are removed similarly to the fourth layer 24. In the second layer 22, as illustrated in FIG. 4, only one of the opposite corner portions positioned in the transverse direction 3 is removed at one end of the second layer 22 in the longitudinal direction 2 in the manner similar to the fourth layer 24 and the third layer 23. As illustrated in FIG. 3, one of the opposite corner portions of the first layer 21 positioned in the transverse direction 3 is removed similarly to the second layer 22.

Accordingly, as illustrated in FIG. 2, the upper surface 22A of the second layer 22 and the upper surface 25A of the base 25 are exposed to outside of the pressure sensor chip 20 at respective sides of the projection 24D in the transverse direction 3. A pad 22B is formed on the exposed upper surface 22A, and a pad 25B is formed on the exposed upper surface 25A. These pads 22B and 25B are electrically connected to the ASIC 30 by wires (not illustrated), as is the case for the pad 24C. Accordingly, the second layer 22 including the first diaphragm 26 and the base 25 are electrically connected to the ASIC 30.

Figure 6:
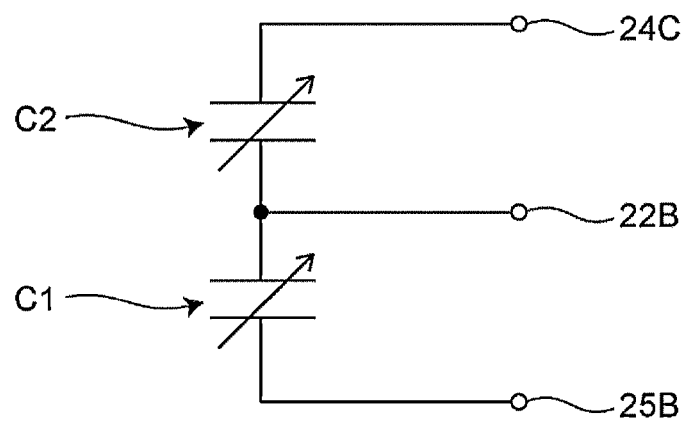
FIG. 6 is a view illustrating an equivalent circuit of the pressure sensor chip of FIG. 1

FIG. 6 is an equivalent circuit of the pressure sensor chip of FIG. 1.

As illustrated in FIG. 1, the first diaphragm 26 of the second layer 22 opposes the base 25 with the cavity 21B being interposed therebetween. In addition, the second layer 22 and the base 25 are both electric conductors as described above. Accordingly, the first diaphragm 26 and the base 25 define a capacitor C1 illustrated in FIG. 6.

As illustrated in FIG. 1, the second diaphragm 27 of the fourth layer 24 opposes the second layer 22 with the second space 23Bb of the cavity 23B being interposed therebetween. In addition, the second layer 22 and the fourth layer 24 are both electric conductors as described above. Accordingly, the second diaphragm 27 and the second layer 22 form a capacitor C2 illustrated in FIG. 6.

Thus, the equivalent circuit illustrated in FIG. 6 is formed in the pressure sensor chip 20.

The lower surface of the first diaphragm 26 faces the cavity 21B. The upper surface of the first diaphragm 26 faces the cavity 23B. As described above, the pressure inside the cavity 21B is lower than the pressure inside the cavity 23B. Accordingly, the first diaphragm 26 bends toward the cavity 21B. The amount of bending of the first diaphragm 26 changes in accordance with the pressure in the cavity 23B. In other words, the first diaphragm 26 is operable to measure pressure relative to the pressure in the sealed cavity 21B. In the first preferred embodiment, the cavity 21B is under vacuum, and accordingly, the pressure in the cavity 21B is measured as an absolute pressure.

The lower surface of the second diaphragm 27 faces the cavity 23B. The upper surface of the second diaphragm 27 faces the cavity 42. Accordingly, the amount of bending of the second diaphragm 27 increases as the differential pressure between the cavity 23B and the cavity 42 increases, and the amount of bending of the second diaphragm 27 decreases as the differential pressure decreases. When the pressure in the cavity 23B is greater than the pressure in the cavity 42, the second diaphragm 27 bends toward the cavity 42, in other words, bends upward. When the pressure in the cavity 42 is greater than the pressure in the cavity 23B, the second diaphragm 27 bends toward the cavity 23B, in other words, bends downward.

Note that in the state illustrated in FIG. 1, the cavity 23B and the cavity 42 are both open to the atmosphere via the caps 51 and 52 and accordingly the differential pressure is zero. When the caps 51 and 52 are connected to pipes or the like, the caps 51 and 52 can receive fluids from different locations or fluids of different types. In this case, the above differential pressure can be other than zero.

The greater the amount of bending of the first diaphragm 26, the smaller the distance between the first diaphragm 26 and the base 25. As a result, the capacitance of the capacitor C1 increases. On the other hand, the smaller the amount of bending of the first diaphragm 26, the greater the distance between the first diaphragm 26 and the base 25. As a result, the capacitance of the capacitor C1 decreases.

The greater the amount of downward bending of the second diaphragm 27, the smaller the distance between the second diaphragm 27 and the second layer 22. As a result, the capacitance of the capacitor C2 increases. On the other hand, the smaller the amount of downward bending of the second diaphragm 27 or the greater the amount of upward bending of the second diaphragm 27, the greater the distance between the second diaphragm 27 and the second layer 22. As a result, the capacitance of the capacitor C2 decreases.

Signals that reflect the conditions of the first diaphragm 26 and the second diaphragm 27 are sent to the ASIC 30 via the pads 22B, 24C, 25B. When the ASIC 30 receives the signals, the ASIC 30 performs the above-described processing (such as the conversion processing, the filtering processing, and the correction processing) and outputs processed signals. The signals processed by the ASIC 30 that correspond to the state of the first diaphragm 26 are the signals indicating the absolute pressure of the fluid taken into the cap 51. The signals processed by the ASIC 30 that correspond to the state of the second diaphragm 27 are the signals indicating the differential pressure between the fluids taken into respective caps 51 and 52.

A method of manufacturing the above-described pressure sensor chip 20 is described below. The process of manufacturing the pressure sensor chip 20 includes four steps, in other words, the first to fourth steps described below.

First of all, the first layer 21 is joined to the upper surface 25A of the base 25. The first layer 21 is made of silicon dioxide, and the cavity 21B is patterned therein. The base 25 is made of silicon. The step of joining the first layer 21 to the base 25 is an example of the first step. The patterning in this step and in the following steps is carried out using a known method, such as etching. The joining is carried out using a known method, such as pressure bonding under high temperature environment.

Next, the second layer 22 made of silicon is joined to the upper surface 21A of the first layer 21 in such a manner that the second layer 22 covers the cavity 21B. The cavity 21B is thereby sealed by the base 25 and the second layer 22. The step of joining the second layer 22 to the first layer 21 is an example of the second step.

In the present preferred embodiment, at least the second step of the first to fourth steps is carried out under vacuum. Accordingly, the sealed cavity 21B remains under vacuum. Note that the second step can be carried out in conditions other than under vacuum. In such a case, the pressure in the cavity 21B is set to be lower than the pressure in the cavity 23B of the third layer 23, which will be joined to the second layer 22 in the third step.

Next, the third layer 23 is joined to the upper surface 22A of the second layer 22. Third layer 23 is made of silicon dioxide, and the cavity 23B is patterned therein. The third layer 23 is joined to the second layer 22 in such a manner that the first space 23Ba of the cavity 23B overlaps the cavity 21B as viewed in plan. In other words, the third layer 23 is joined to the second layer 22 in such a manner that the first diaphragm 26 is formed in the second layer 22 at the position between the cavity 21B and the cavity 23B. In addition, the third layer 23 is joined to the second layer 22 in such a manner that the second space 23Bb of the cavity 23B does not overlap the cavity 21B as viewed in plan. The step of joining the third layer 23 to the second layer 22 is an example of the third step.

Next, the fourth layer 24 is joined to the upper surface 23A of the third layer 23. The fourth layer 24 is made of silicon, and the cavity 24B is patterned therein. In the state of the fourth layer 24 being joined to the third layer 23, the upper surface 24A of the fourth layer 24 is exposed to outside. Accordingly, the top end of the cavity 24B is in communication with the outside.

The fourth layer 24 is joined to the third layer 23 in such a manner that the cavity 24B overlaps the cavity 23B as viewed in plan. In other words, the fourth layer 24 is joined to the third layer 23 in such a manner that the bottom end of the cavity 24B is in communication with the cavity 23B.

In addition, the fourth layer 24 is joined to the third layer 23 in such a manner that a portion of the fourth layer 24 other than the cavity 24B overlaps the second space 23Bb of the cavity 23B as viewed in plan. In other words, the fourth layer 24 is joined to the third layer 23 in such a manner that the second diaphragm 27 is formed in the fourth layer 24 at the position between the cavity 23B and the space that the upper surface 24A faces (i.e., the outside space).

The step of joining the fourth layer 24 to the third layer 23 is an example of the fourth step.

The pressure sensor chip 20 is manufactured by carrying out the first to fourth steps.

Next, the pressure sensor chip 20 manufactured through the above steps is mounted on the substrate 10. Components, such as the ASIC 30 and resistors, are also mounted on the substrate 10 as needed. The pressure sensor chip 20 and the above components are mounted on the substrate 10 using a known method, such as a surface mounting technology or a through-hole mounting technology. In the first preferred embodiment, the pressure sensor chip 20 and the ASIC 30 are adhered to the substrate 10 using an adhesive (not illustrated) that is applied to the bottom surfaces of the pressure sensor chip 20 and the ASIC 30.

Next, wires, such as the wires 31 and 32, are wired using a known method. In the first preferred embodiment, the wires 31 and 32 are wired using wire bonding. One end of the wire 31 is connected to the pad 24C formed on the fourth layer 24, and the other end is connected to the ASIC 30. Other wires that connect the pressure sensor chip 20 to the ASIC 30 are wired in a manner similar to the wire 31. Both ends of the wire 32 are connected respectively to the pad 33 and the ASIC 30 that are disposed on the upper surface of the substrate 10.

Next, the first covering portion 40 made of a resin is formed so as to cover the upper surface 10A of the substrate 10 and also cover the pressure sensor chip 20 and the ASIC 30 that are mounted on the upper surface 10A. The first covering portion 40 covers the surfaces of the pressure sensor chip 20 except for the lower surface of the base 25. In other words, the first covering portion 40 covers and the upper surface 24A of the fourth layer 24 and the side surfaces of the first layer 21, the second layer 22, the third layer 23, and the fourth layer 24.

The first covering portion 40 is formed so as to cover the upper surface 10A of the substrate 10 using a known method, such as injection molding. In the first preferred embodiment, the first covering portion 40 in a softened state is injected toward the upper surface 10A of the substrate 10. In this step, a die is used to form the cavities 41 and 42 that pierce the first covering portion 40 in the height direction 4. The cavities 41 and 42 are formed directly above the upper surface 24A of the fourth layer 24. The cavity 41 is formed so as to overlap the cavity 24B as viewed in plan. As a result, the cavity 41 exposes the cavity 24B to outside. The cavity 42 is formed so as to overlap the second space 23Bb of the cavity 23B as viewed in plan. As a result, the cavity 42 exposes a portion of the upper surface 24A of the fourth layer 24 positioned directly above the second space 23Bb to outside. Thus, the second diaphragm 27 is formed in the fourth layer 24 at the position between the cavity 42 and the second space 23Bb.

Next, the second covering portion 50 made of a resin is formed so as to cover an upper surface 40A of the first covering portion 40. As is the case for the first covering portion 40, the second covering portion 50 covers the upper surface of the first covering portion 40 using a known method. In this step, a die is used to form the caps 51 and 52 in the second covering portion 50. In the first preferred embodiment, the caps 51 and 52 are shaped like tubes projecting upward. The cap 51 is formed directly above the cavity 41, which enables the cavity 41 to communicate with the outside through the internal space 53 of the cap 51. The cap 52 is formed directly above the cavity 42, which enables the cavity 42 to communicate with the outside through the internal space 54 of the cap 52.

The step of forming the first covering portion 40 and the second covering portion 50 so as to cover the pressure sensor chip 20 is an example of the fifth step.

According to the first preferred embodiment, the pressure in the cavity 21B and the pressure in the cavity 23B act on the first diaphragm 26. This enables the first diaphragm 26 to measure pressure relative to the pressure in the sealed cavity 21B. The pressure in the cavity 23B and the pressure from the outside act on the second diaphragm 27. The pressure from the outside acts on the upper surface 24A of the fourth layer 24 through the internal space 54 of the cap 52 and through the cavity 42. This enables the second diaphragm 27 to measure the differential pressure between the above two pressures. In other words, according to the first preferred embodiment, a single pressure sensor chip 20 can measure the differential pressure between two pressures as well as the pressure relative to the pressure in the cavity 21B. Moreover, two diaphragms (the first diaphragm 26 and the second diaphragm 27) are integrated in the single pressure sensor chip 20. As a result, the size of the pressure sensor chip 20 can be reduced.

According to the first preferred embodiment, the first diaphragm 26 and the second diaphragm 27 are formed in different layers. As a result, the thickness of the second layer 22 in which the first diaphragm 26 is formed and the thickness of the fourth layer 24 in which the second diaphragm 27 is formed can be made differently without complicating the manufacturing process.

In the first preferred embodiment, the cavity 21B is under vacuum. This enables the first diaphragm 26 to function as a diaphragm to measure absolute pressure.

According to the first preferred embodiment, the pressure sensor chip 20 can operate as a capacitance sensor.

According to the first preferred embodiment, the first diaphragm 26 does not overlap the second diaphragm 27 as viewed in plan. This reduces the likelihood of the pressure in the cavity 21B affecting the second diaphragm 27 via the second layer 22 and the cavity 23B. This enables the second diaphragm 27 to measure the differential pressure accurately.

According to the first preferred embodiment, the first covering portion 40 can protect the pressure sensor chip 20.

According to the first preferred embodiment, the pressure sensor 1 can be connected easily to outside devices through the caps 51 and 52.

According to the method of manufacturing the pressure sensor chip 20 and the pressure sensor 1 of the first preferred embodiment, the pressure sensor chip 20 and the pressure sensor 1 can be manufactured without using a complicated step, for example, a step of changing the thickness of the same layer.

The shapes of the cavities 21B, 23B, and 24B of the pressure sensor chip 20, the shapes of the cavities 41 and 42 of the first covering portion 40, and the shapes of the caps 51 and 52 of the second covering portion 50 are not limited to those described in the first preferred embodiment.

For example, the shape of the cavity 21B, the shapes of the first space 23Ba and the second space 23Bb of the cavity 23B, and the shape of the cavity 24B are described as rectangles as viewed in plan in the first preferred embodiment. These shapes, however, may be others, such as circles.

The positions and sizes of the cavities 21B, 23B, 24B of the pressure sensor chip 20, the positions and sizes of the cavities 41 and 42 of the first covering portion 40, and the positions and sizes of the caps 51 and 52 of the second covering portion 50 are not limited to those described in the first preferred embodiment. The positions and sizes, however, preferably satisfy the following four conditions.

The first condition is that at least a portion of the cavity 21B overlaps at least a portion of the cavity 23B as viewed in plan. The first diaphragm 26 is a portion of the second layer 22 that overlaps the cavity 21B and the cavity 23B as viewed in plan. The second condition is that at least a portion of the cavity 24B overlaps at least a portion of the cavity 23B as viewed in plan. This enables the cavity 23B to communicate with the outside through the cavity 24B. Third condition is that at least a portion of the cavity 24B overlaps at least a portion of the cavity 41 as viewed in plan. The fourth condition is that the cavity 24B does not overlap the cavity 42 as viewed in plan.

In the first preferred embodiment, for example, the cavity 24B overlaps only the first space 23Ba of the cavity 23B as viewed in plan. The cavity 24B, however, can overlap the third space 23Bc instead of, or in addition to, the first space 23Ba.

In the first preferred embodiment, as illustrated in FIG. 5, the third space 23Bc of the cavity 23B is narrower than the first space 23Ba and the second space 23Bb. The position, size, and shape of the third space 23Bc, however, are not limited to those illustrated in FIG. 5. For example, the width of the third space 23Bc (i.e., the length in the transverse direction 3) can be longer or shorter than the width illustrated in FIG. 5. Moreover, the third space 23Bc can extend in the longitudinal direction 2 while inclining toward one side or the other side in the transverse direction 3. Note that the third space 23Bc preferably extend straight and does not curve or bend.

In the first preferred embodiment, the thicknesses (the lengths in the height direction 4) of the first layer 21, the second layer 22, the third layer 23, and the fourth layer 24 are described as being the same as illustrated in FIG. 1. The thicknesses, however, can be different from each other.

Figure 7:
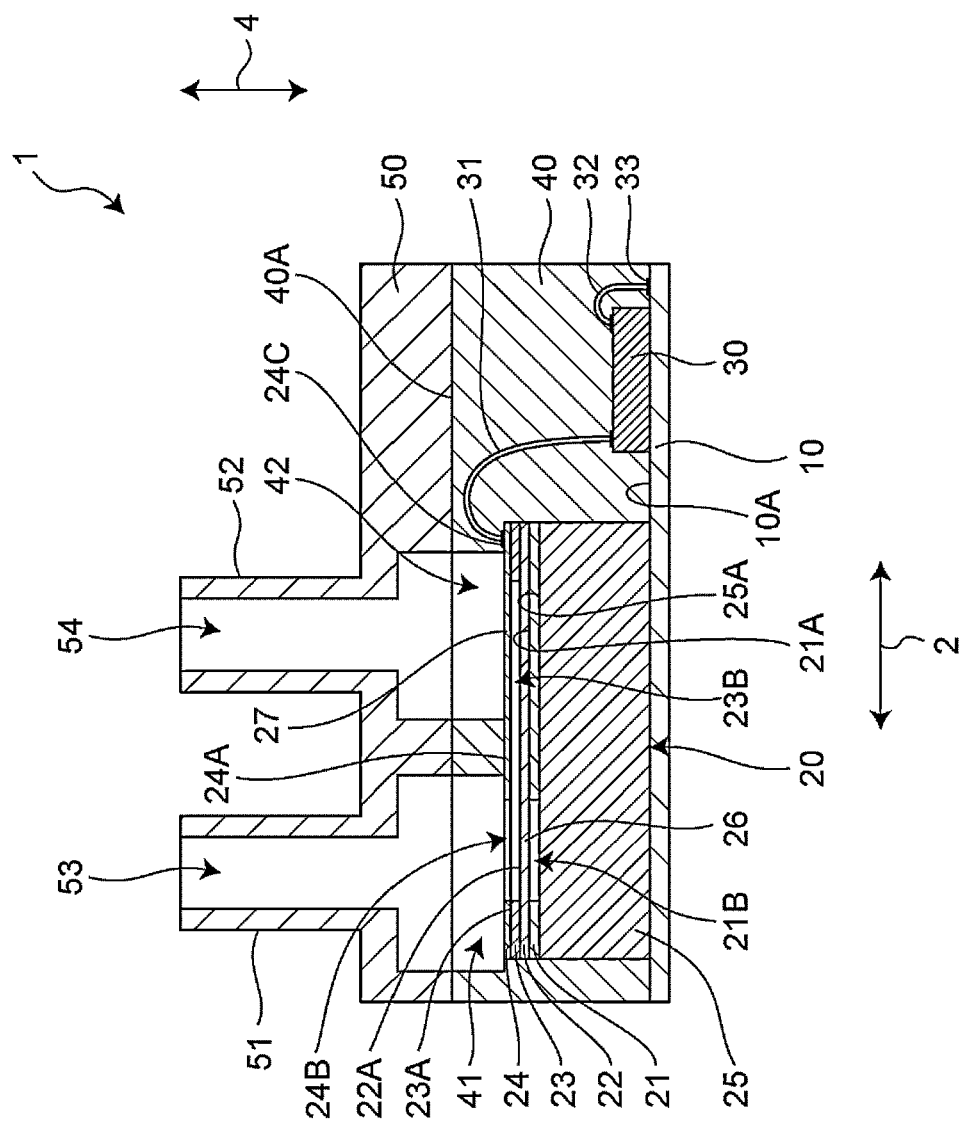
FIG. 7 is a longitudinal sectional view illustrating a pressure sensor in which a fourth layer is thinner than a second layer.

For example, as illustrated in FIG. 7, the thickness of the fourth layer 24 can be smaller than the thickness of the second layer 22. Due to the second diaphragm 27 being thinner than the first diaphragm 26, the second diaphragm 27 can be bent by a small pressure difference. In addition, because the cavity 21B is under vacuum or has a lower pressure, the first diaphragm 26 may bend largely and break. The first diaphragm 26, however, is thicker than the second diaphragm 27, which can reduce or prevent the likelihood of the first diaphragm 26 breaking.

The first layer 21 and the third layer 23 can include multiple layers. In this case, the cavity 21B pierces the multiple layers included in the first layer 21 in the height direction 4, and the cavity 23B pierces the multiple layers included in the third layer 23 in the height direction 4.

In the first preferred embodiment, the capacitor C1 is between the first diaphragm 26 and the base 25 in the pressure sensor chip 20, and the capacitor C2 is between the second diaphragm 27 and the second layer 22 (see FIG. 6). Accordingly, the pressure sensor chip 20 operates as the capacitance sensor. The pressure sensor chip 20, however, is not limited to the capacitance sensor. For example, strain gauges may be provided on the first diaphragm 26 and the second diaphragm 27, and the pressure sensor chip 20 may operate as a piezoelectric sensor.

Second Preferred Embodiment

Figure 8:
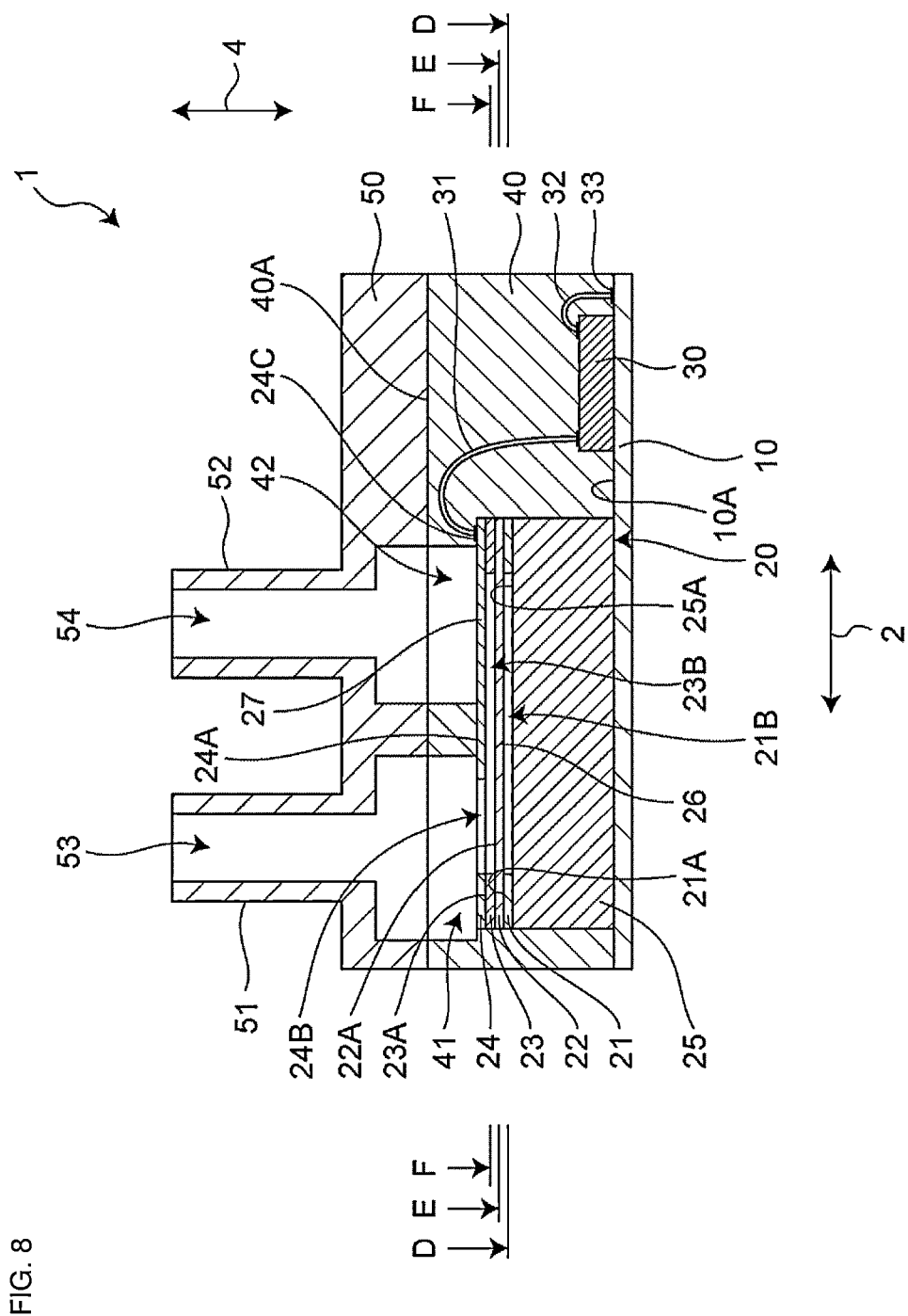
FIG. 8 is a longitudinal sectional view illustrating a pressure sensor according to a second preferred embodiment of the present invention.
Figure 9:
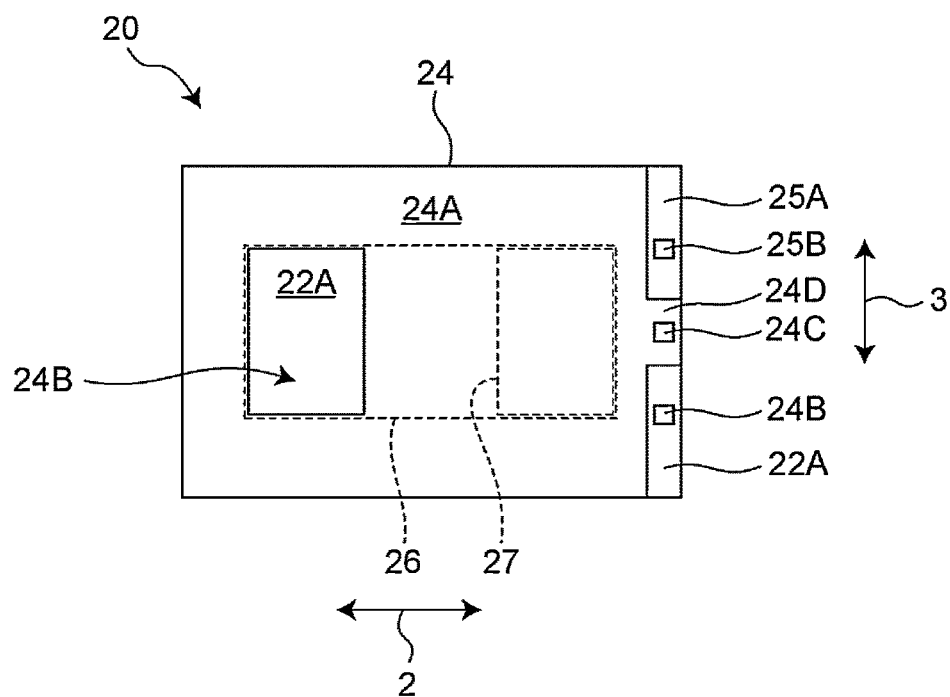
FIG. 9 is a plan view illustrating a pressure sensor chip included in the pressure sensor of FIG. 8.
Figure 10:
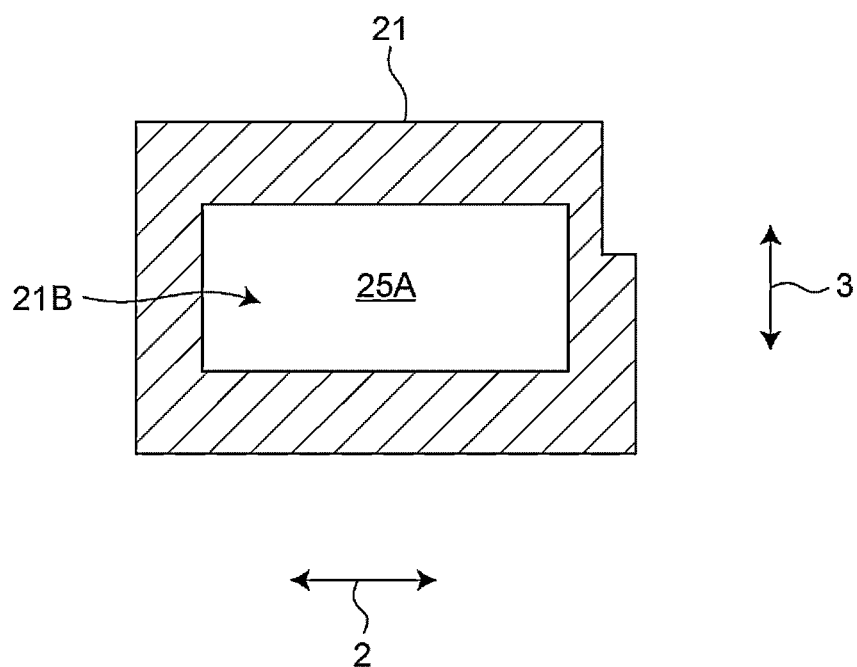
FIG. 10 is a cross-sectional view taken along line D-D in FIG. 8.
Figure 11:
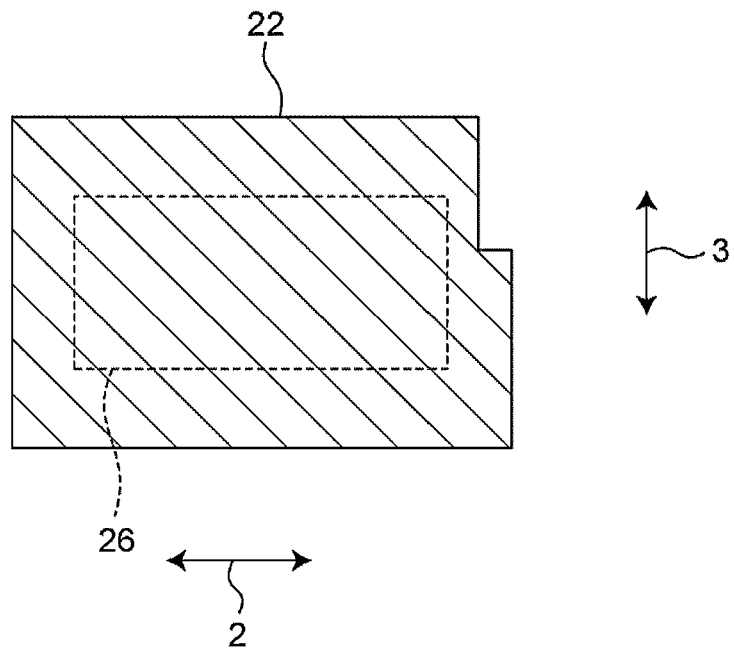
FIG. 11 is a cross-sectional view taken along line E-E in FIG. 8.
Figure 12:
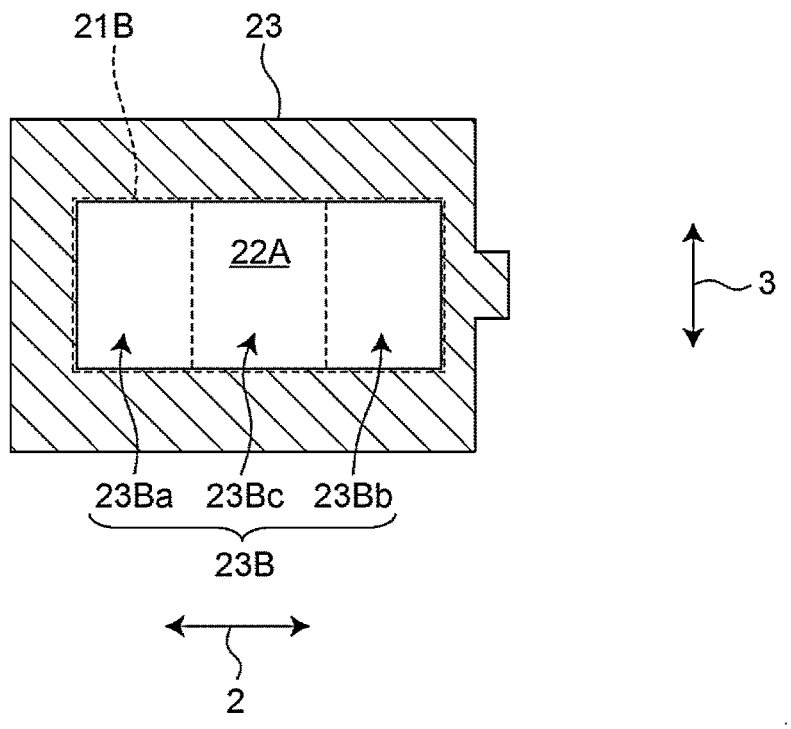
FIG. 12 is a cross-sectional view taken along line F-F in FIG. 8.

FIG. 8 is a longitudinal sectional view illustrating a pressure sensor according to a second preferred embodiment of the present invention. FIG. 9 is a plan view illustrating a pressure sensor chip included in the pressure sensor of FIG. 8. FIG. 10 is section D-D of the pressure sensor chip illustrated in FIG. 8. FIG. 11 is section E-E of the pressure sensor chip illustrated in FIG. 8. FIG. 12 is section F-F of the pressure sensor chip illustrated in FIG. 8.

The pressure sensor of the second preferred embodiment is different from the pressure sensor of the first preferred embodiment in that as viewed in plan, the first diaphragm overlaps the second diaphragm and the cavity in the third layer has a rectangular shape.

The cavity 21B of the second preferred embodiment (see FIG. 10) is larger than the cavity 21B of the first preferred embodiment (see FIG. 3). As illustrated in FIG. 8, the cavity 21B of the first layer 21 extends from a position under the cavity 41 to a position under the cavity 42. Accordingly, the first diaphragm 26 of the second preferred embodiment (see FIG. 11) is larger than the first diaphragm 26 of the first preferred embodiment (see FIG. 4). As a result, the first diaphragm 26 overlaps the second diaphragm 27 as viewed in plan, as illustrated in FIG. 9.

As illustrated in FIG. 12, the width of the third space 23Bc of the cavity 23B, in the other words, the length of the third space 23Bc in the transverse direction 3 is equal to the length of the first space 23Ba and the length of the second space 23Bb in the transverse direction 3. Accordingly, the cavity 23B is shaped like a rectangle. In FIG. 12, the border lines between the third space 23Bc and the first space 23Ba and between the third space 23Bc and the second space 23Bb are indicated by dotted lines.

According to the second preferred embodiment, the first diaphragm 26 is larger than that of the first preferred embodiment, which can increase the sensitivity of the first diaphragm 26 compared with that of the first preferred embodiment.

Third Preferred Embodiment

Figure 13:
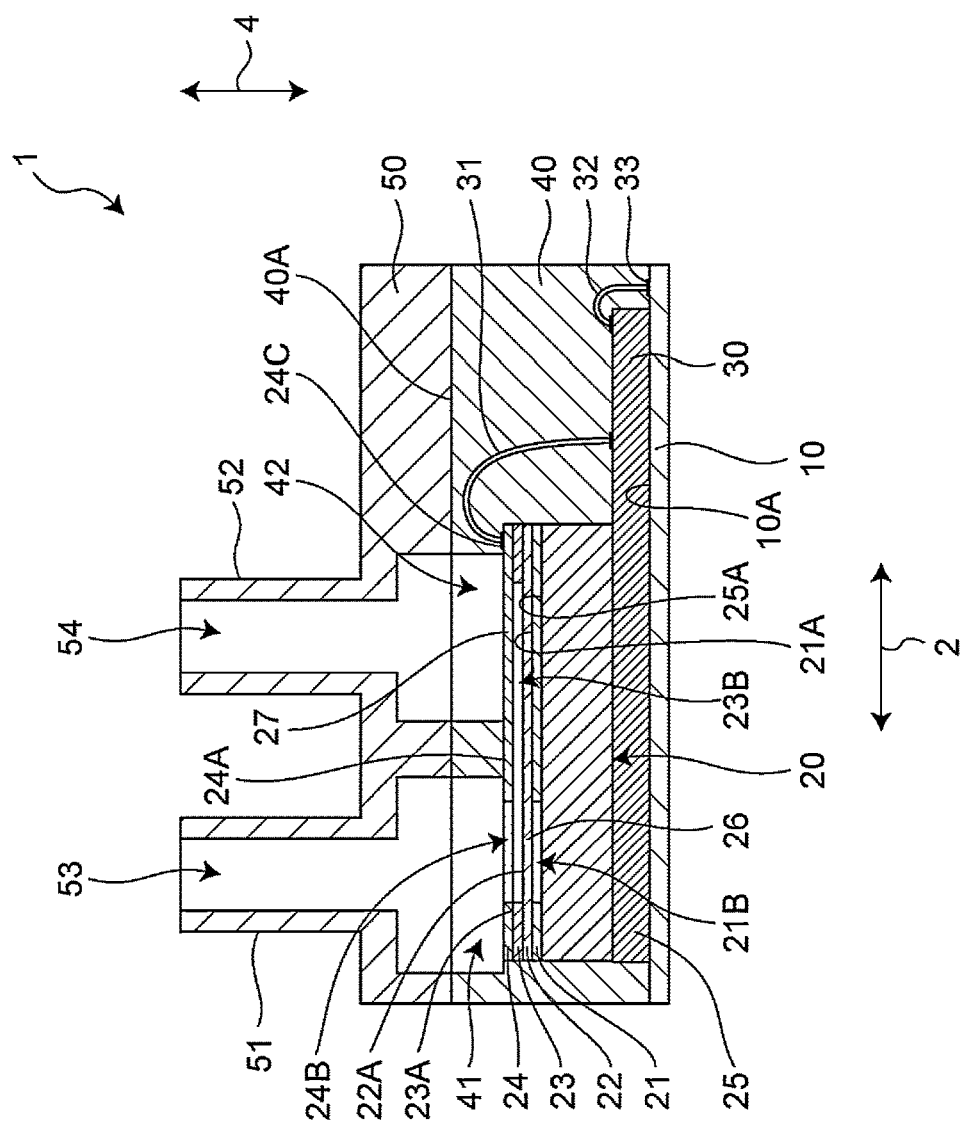
FIG. 13 is a longitudinal sectional view illustrating a pressure sensor according to a third preferred embodiment of the present invention.

FIG. 13 is a longitudinal sectional view illustrating a pressure sensor according to a third preferred embodiment of the present invention.

The pressure sensor of the third preferred embodiment is different from the pressure sensor of the first preferred embodiment in that the pressure sensor chip is disposed on the ASIC.

The ASIC 30 of the third preferred embodiment (see FIG. 13) is larger than the ASIC 30 of the first preferred embodiment (see FIG. 1). As illustrated in FIG. 13, the pressure sensor chip 20 is mounted on the upper surface of the ASIC 30. The pressure sensor chip 20 is fixed to the upper surface of the ASIC using a known method, such as adhesion using an adhesive.

Fourth Preferred Embodiment

Figure 14:
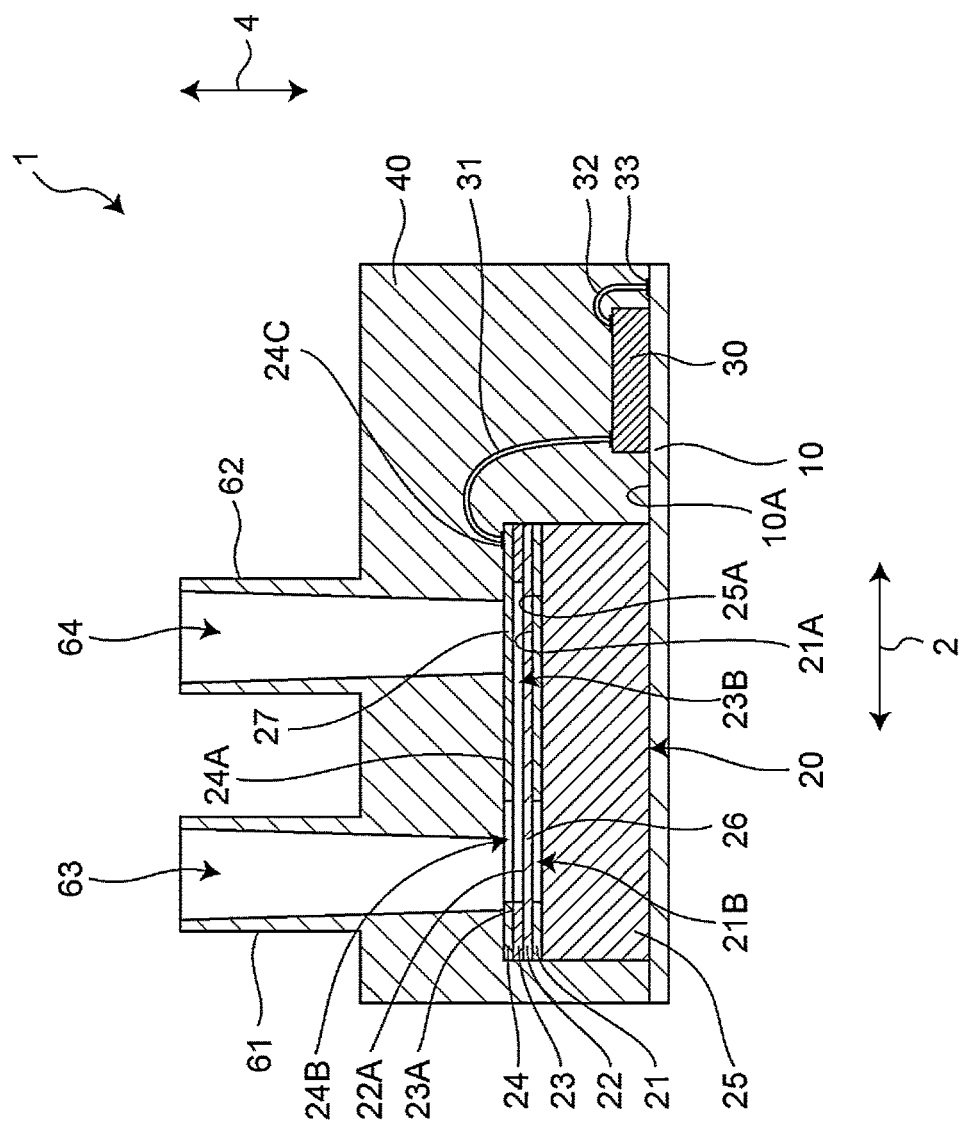
FIG. 14 is a longitudinal sectional view illustrating a pressure sensor according to a fourth preferred embodiment of the present invention.

FIG. 14 is a longitudinal sectional view illustrating a pressure sensor according to a fourth preferred embodiment of the present invention.

The pressure sensor of the fourth preferred embodiment is different from the pressure sensor of the first preferred embodiment in that the first covering portion and the second covering portion are formed integrally and the internal spaces of the caps are shaped differently.

In the fourth preferred embodiment, as illustrated in FIG. 14, the first covering portion 40 and the second covering portion 50 of the first preferred embodiment are integrated with each other. In the fourth preferred embodiment, a covering portion in which the first covering portion 40 and the second covering portion 50 are integrated is referred to as a "covering portion 60".

The covering portion 60 includes caps 61 and 62. The structure of the cap 61 is substantially the same as that of the cap 51 of the first preferred embodiment. The structure of the cap 62 is substantially the same as that of the cap 52 of the first preferred embodiment. In the fourth preferred embodiment, the caps 61 and 62 are shaped like tubes. However, internal spaces 63 and 64 in respective caps 61 and 62 are different from the internal spaces 53 and 54 of the caps 51 and 52 of the first preferred embodiment. More specifically, the smaller the inside diameter of each of the internal spaces 63 and 64, the lower the position (in other words, as it goes closer to the pressure sensor chip 20). The internal space 63 of the cap 61 is in communication with the cavity 24B of the fourth layer 24. The internal space 64 of the cap 62 is positioned above a portion of the fourth layer 24 where the cavity 24B is not provided.

In the manufacturing process of the pressure sensor chip 20, the covering portion 60 is formed so as to cover the upper surface 10A of the substrate 10 using a known method, such as injection molding, as is the case for the first covering portion 40 of the first preferred embodiment. In this step, a die is used to form the caps 61 and 62 in the covering portion 60. The die can be used to form the internal spaces 63 and 64 of the caps 61 and 62 because the diameter of each internal space decreases with the position being lower. Note that the shapes of the internal spaces 63 and 64 and the external shapes of the caps 61 and 62 are not limited to those illustrated in FIG. 14.

Configurations of different preferred embodiments can be combined appropriately with one another, and resulted combinations are able to provide advantageous effects similar to those obtained in the original preferred embodiments.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pressure sensor chip comprising:
   a first diaphragm and a second diaphragm to measure pressure;
   a base;
   a first layer including a first cavity and joined to the base;
   a second layer joined to a surface of the first layer opposite to the base;
   a third layer including a second cavity and joined to a surface of the second layer opposite to the first layer; and
   a fourth layer including a third cavity and joined to a surface of the third layer opposite to the second layer; wherein
   the second layer includes the first diaphragm between the first cavity and the second cavity;
   the fourth layer includes the second diaphragm between the second cavity and a space in communication with outside;

a first end of the third cavity is in communication with outside;

a second end of the third cavity is in communication with the second cavity; and the first cavity is sealed and a pressure in the first cavity is lower than a pressure in the second cavity.

2. The pressure sensor chip according to claim 1, wherein the first cavity is under vacuum or substantially under vacuum.

3. The pressure sensor chip according to claim 1, wherein the fourth layer has a thickness smaller than a thickness of the second layer.

4. The pressure sensor chip according to claim 1, wherein
the base, the second layer, and the fourth layer are electrical conductors; and the first layer and the third layer are electrical insulators.

5. The pressure sensor chip according to claim 1, wherein the first diaphragm does not overlap the second diaphragm as viewed in plan.

6. The pressure sensor chip according to claim 1, wherein the first diaphragm overlaps the second diaphragm as viewed in plan.

7. A pressure sensor, comprising:
the pressure sensor chip according to claim 1; and
a covering portion covering the pressure sensor chip; wherein
the covering portion includes:
 a fourth cavity through which the third cavity is in communication with outside;
 a fifth cavity through which the surface of the fourth layer opposite to the third layer is exposed to outside, and the second diaphragm is between the second cavity and the fifth cavity.

8. The pressure sensor according to claim 7, wherein the covering portion includes:
a tubular-shaped first cap protruding from a periphery of the fourth cavity in a direction away from the pressure sensor chip; and
a tubular-shaped second cap protruding from a periphery of the fifth cavity in a direction away from the pressure sensor chip.

9. The pressure sensor according to claim 7, wherein the first cavity is under vacuum or substantially under vacuum.

10. The pressure sensor according to claim 7, wherein the fourth layer has a thickness smaller than a thickness of the second layer.

11. The pressure sensor according to claim 7, wherein
the base, the second layer, and the fourth layer are electrical conductors; and the first layer and the third layer are electrical insulators.

12. The pressure sensor according to claim 7, wherein the first diaphragm does not overlap the second diaphragm as viewed in plan.

13. The pressure sensor according to claim 7, wherein the first diaphragm overlaps the second diaphragm as viewed in plan.

14. A method of manufacturing a pressure sensor chip, the method comprising:
joining a first layer to a base, the first layer including a first cavity patterned therein;
joining a second layer to a surface of the first layer opposite to the base;
joining a third layer to a surface of the second layer opposite to the first layer, the third layer including a second cavity patterned therein, the third layer being joined in such a manner that a first diaphragm is formed in the second layer between the first cavity and the second cavity; and
joining a fourth layer to a surface of the third layer opposite to the second layer, the fourth layer including a third cavity patterned therein, the fourth layer being joined in such a manner that:
 a first end of the third cavity is in communication with outside;
 a second end of the third cavity is in communication with the second cavity; and
 a second diaphragm is formed in the fourth layer between the second cavity and a space in communication with the outside.

15. A method of manufacturing a pressure sensor, the method comprising:
joining a first layer to a base, the first layer including a first cavity patterned therein;
joining a second layer to a surface of the first layer opposite to the base;
joining a third layer to a surface of the second layer opposite to the first layer, the third layer including a second cavity patterned therein, the third layer being joined in such a manner that a first diaphragm is formed in the second layer between the first cavity and the second cavity;
joining a fourth layer to a surface of the third layer opposite to the second layer, the fourth layer including a third cavity patterned therein, the fourth layer being joined in such a manner that the third cavity is in communication with the second cavity; and
forming a covering portion so as to cover the base, the first layer, the second layer, the third layer, and the first layer, the covering portion including a fourth cavity and a fifth cavity, the covering portion being formed in such a manner that:
 the fourth cavity exposes the third cavity to outside;
 the fifth cavity exposes to outside a surface of the fourth layer opposite to the third layer; and
 a second diaphragm is formed in the fourth layer between the second cavity and the fifth cavity.

* * * * *